United States Patent
Pratt et al.

[11] Patent Number: 6,070,254
[45] Date of Patent: May 30, 2000

[54] ADVANCED METHOD FOR CHECKING THE INTEGRITY OF NODE-BASED FILE SYSTEMS

[75] Inventors: Steven L. Pratt; Benedict M. Rafanello, both of Round Rock, Tex.

[73] Assignee: International Business Machines Corporation, Armonk, N.Y.

[21] Appl. No.: 08/953,346

[22] Filed: Oct. 17, 1997

[51] Int. Cl.[7] .................................................. G06F 11/00
[52] U.S. Cl. .............................................. 714/43; 714/48
[58] Field of Search ................................. 714/43, 48, 47, 714/49, 703, 6

[56] References Cited

U.S. PATENT DOCUMENTS

| | | | |
|---|---|---|---|
| 4,887,204 | 12/1989 | Johnson et al. | 364/200 |
| 5,230,047 | 7/1993 | Frey, Jr. et al. | 395/575 |
| 5,331,673 | 7/1994 | Elko et al. | 395/575 |
| 5,371,885 | 12/1994 | Letwin | 395/600 |
| 5,423,044 | 6/1995 | Sutton et al. | 395/725 |
| 5,506,983 | 4/1996 | Atkinson et al. | 395/600 |
| 5,524,253 | 6/1996 | Pham et al. | 395/800 |
| 5,560,029 | 9/1996 | Papadopoulos et al. | 395/800 |
| 5,564,011 | 10/1996 | Yammine et al. | 395/182.13 |
| 5,566,326 | 10/1996 | Hirsch et al. | 395/500 |
| 5,572,711 | 11/1996 | Hirsch et al. | 395/500 |
| 5,586,264 | 12/1996 | Belknap et al. | 395/200.08 |
| 5,594,863 | 1/1997 | Stiles | 395/182.13 |
| 5,603,058 | 2/1997 | Belknap et al. | 395/855 |
| 5,608,865 | 3/1997 | Midgely et al. | 395/180 |
| 5,608,901 | 3/1997 | Letwin | 395/621 |
| 5,613,155 | 3/1997 | Baldiga et al. | 395/825 |
| 5,675,769 | 10/1997 | Ruff et al. | 395/497.04 |

FOREIGN PATENT DOCUMENTS

WO 94/29796  12/1994  WIPO ........................ G06F 12/02

OTHER PUBLICATIONS

Tweten, "Hiding Mass Storage Under Unix: NASA's MSS–II Architecture", IEEE, pp. 140–145, 1990.

*Primary Examiner*—Dieu-Minh T. Le
*Assistant Examiner*—Scott T. Baderman
*Attorney, Agent, or Firm*—Jeffrey S. LaBaw; Daniel E. Venglarik; Andrew J. Dillon

[57] ABSTRACT

A high performance file system (HPFS) is validated by checking the directory entries to the extent possible, saving the information required to check F-Nodes and queuing detected errors together with corrective actions. The F-Nodes are then checked in order, minimizing the head motion required to read the F-Nodes and also reducing the I/O time required for the validation process. The detected errors may then be processed, corrective action taken, and the affected DIRBLK written. To reduce the amount of memory required, the directory structure of an HPFS storage device may be processed employing a breadth-first, level-by-level approach. Checking of the directory entries may be further segmented into multiple threads to take advantage of the ability of RAID systems to issue multiple read requests.

30 Claims, 7 Drawing Sheets

ADVANCED METHOD FOR CHECKING THE INTEGRITY OF NODE-BASED FILE SYSTEMS

BACKGROUND OF THE INVENTION

1. Technical Field

The present invention relates in general to node-based file systems and in particular to checking the integrity of node-based file systems. Still more particularly, the present invention relates to reducing latency attributable to reading nodes when validating the integrity of a node-based file system.

2. Description of the Related Art

Node-based file systems, such as the High Performance File System (HPFS) employed by the OS/2 operating system or various UNIX file systems, store information about files in two locations on the storage media. In HPFS, for example, the first location is the directory entry for the file, while the second location is the F-Node for the file. When checking a disk drive containing files under HPFS, both locations must be checked for every file on the drive. In the case of HPFS, directory entries are located in Directory Blocks (DIRBLKs), which HPFS attempts to locate in the seek-center of the disk or partition. For performance reasons, HPFS locates the F-Node for a file near the location on the disk where the file's data resides. Moreover, to avoid fragmenting files, HPFS distributes files across the disk or partition instead of packing them closely together. The result is that F-Nodes tend to be randomly distributed across the disk or partition.

When validating the integrity of HPFS files in recovering a system that may have experienced a power outage or crash, the traditional method for checking an HPFS drive consists of walking the directory structure of the drive and checking the directory entries and their corresponding F-Nodes as they are encountered. Since HPFS attempts to keep the DIRBLKs which contain the directory entries in the center of the drive, the head motion required to go from one DIRBLK to the next should be minimal. However, since the F-Node for each directory entry is conventionally checked when the directory entry is checked, and since F-Nodes are randomly distributed across the disk or partition, any benefit from having the DIRBLKs grouped together in the seek-center of the drive is lost.

The problem of optimizing integrity checking is further complicated when the files for a node-based file system such as HPFS are stored in a redundant array of inexpensive disks (RAID) storage media. In RAID systems, several disks drives are connected in an array where they are combined and coordinated to give the appearance of a single disk drive. Currently there are six accepted standards for RAID implementation, RAID 0 through RAID 5. The most popular RAID implementations, RAID 0 and RAID 5, data is striped across the drives being combined. That is, sequential units of data are stored on different disk drives, thereby spreading the data across all of the drives in the array. This allows the RAID controller to direct read requests to multiple drives simultaneously. However, the traditional method of validating a file system cannot take advantage of the ability to direct multiple input/output (I/O) requests.

It would be desirable, therefore, to devise a method of validating the integrity of a node-based file system which reduces the overhead required to read both elements of directory information. It would further be advantageous if the method could be optimized to take advantage of the ability in RAID systems to issue multiple read requests.

SUMMARY OF THE INVENTION

It is therefore one object of the present invention to provide an improved validation mechanism for node-based file systems.

It is another object of the present invention to provide an improved method and apparatus for checking the integrity of node-based file systems.

It is yet another object of the present invention to provide a method of reducing latency attributable to reading nodes when validating the integrity of a node-based file system.

The foregoing objects are achieved as is now described. A high performance file system (HPFS) is validated by checking the directory entries to the extent possible, saving the information required to check F-Nodes and queuing detected errors together with corrective actions. The F-Nodes are then checked in order, minimizing the head motion required to read the F-Nodes and also reducing the I/O time required for the validation process. The detected errors may then be processed, corrective action taken, and the affected DIRBLK written. To reduce the amount of memory required, the directory structure of an HPFS storage device may be processed employing a breadth-first, level-by-level approach. Checking of the directory entries may be further segmented into multiple threads to take advantage of the ability of RAID systems to issue multiple read requests.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
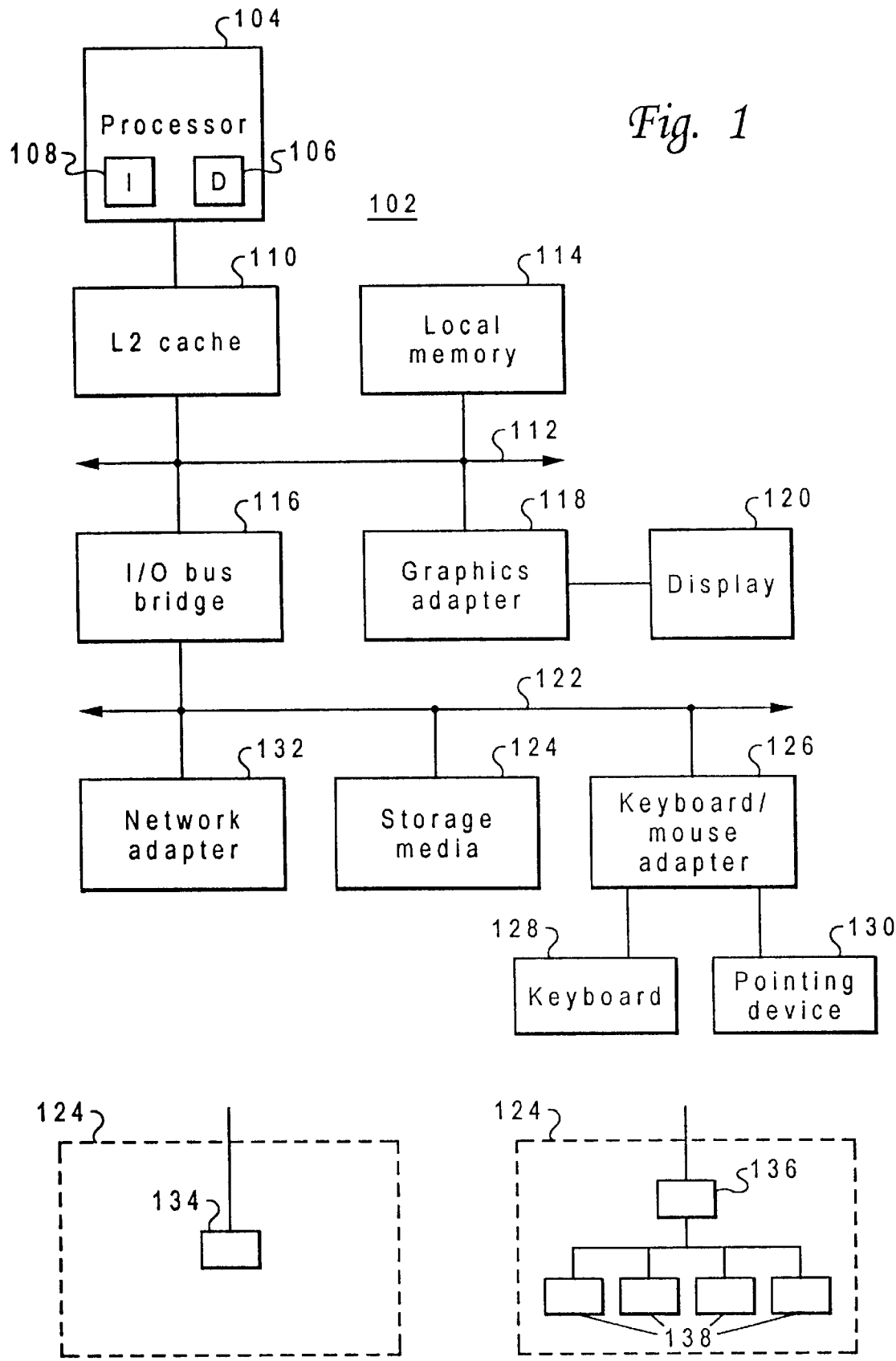
FIG. 1 depicts a data processing system in which a preferred embodiment of the present invention may be implemented.

With reference now to the figures, and in particular with reference to FIG. 1, a data processing system in which a preferred embodiment of the present invention may be implemented is illustrated. Data processing system 102 includes a processor 104 having internal level one instruction and data caches 106 and 108. Processor 104 is connected to a level two (L2) cache 110, which is connected via system bus 112 to system memory 114 and to bridge 116. Memory mapped devices, such as graphics adapter 118 connected to display unit 120, may also be connected to system bus 112.

Bridge 116 connects system bus 112 to input/output (I/O) bus 122. Various peripherals may be connected to I/O bus 122, such as storage media 124. Keyboard/mouse adapter 126 connected to I/O bus 122 allows a keyboard 128 and pointing device 130 such as a mouse or trackball to be connected to data processing system 102. Network adapter 132 connected to I/O bus 122 allows data processing system 102 to be connected to a local area network (LAN).

The operation of data processing system 102 is well known to those skilled in the art. Furthermore, those in the art will recognize that the components depicted in the exemplary embodiment may be varied for purposes of specific applications. For example, additional peripheral devices such as a CD-ROM drive may be incorporated into data processing system 102.

Storage media 124 in accordance with the present invention may be a single disk drive 134, or a RAID storage device including a RAID controller 136 and multiple disk drives 138. The configuration of RAID controller 136 and its connection to disk drives 138 is well known in the art. In accordance with a preferred embodiment of the present invention, data processing system 102 includes a node-based file system within storage media 124 and software having the functionality described below for validating the integrity of the files in storage media 124.

Figure 2:
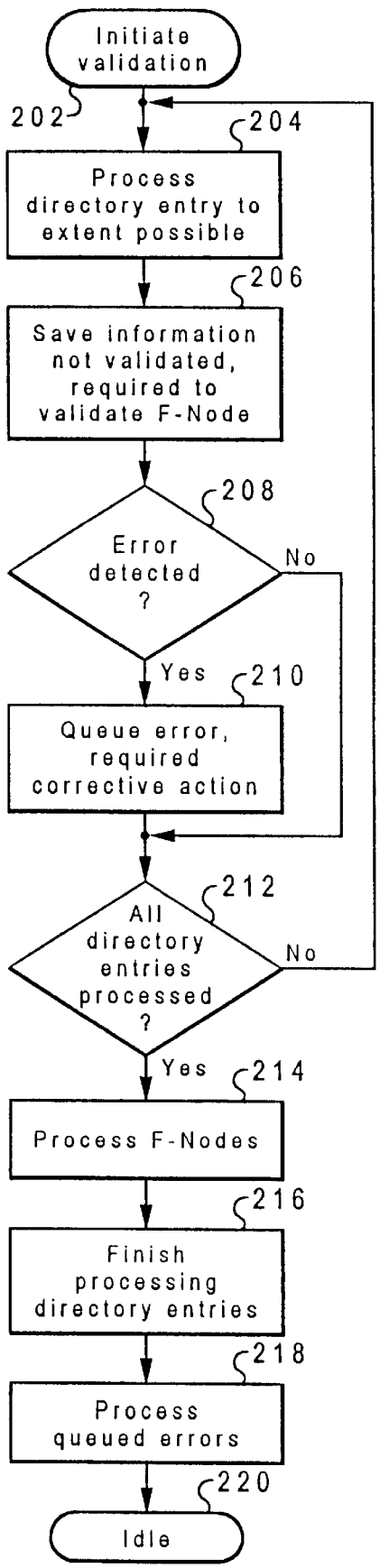
FIG. 2 is a high level flowchart for a basic process of validating a node-based file system in accordance with a preferred embodiment of the present invention.

Referring to FIG. 2, a high level flowchart for a basic process of validating a node-based file system in accordance with a preferred embodiment of the present invention is illustrated. The process may be implemented within a data processing system such as that depicted in FIG. 1. The process described below, together with other processes described herein, employ HPFS as an example for the purposes of describing and explaining the invention. However, those skilled in the art will recognize that the present invention may be suitably implemented in connection with other node-based file systems. Structures equivalent to those described below in connection with HPFS may be readily identified in other node-based file systems by those skilled in the art. For example, the journalling file system (JFS) designates structures equivalent to HPFS F-Nodes as "I-Nodes," as do the file systems employed by the Unix and Advanced Interactive Executive (AIX) operating systems. JFS also designates the structures equivalent to directory entries as "directory I-Nodes."

The process begins at step 202, which depicts initiation of the validation process. Since the processor can process data from the directory entries and F-Nodes much faster than the storage media can deliver that information, the vast majority of the time spent checking an HPFS storage device is spent waiting for the device to deliver the directory entry and F-Node data. The time required for a single disk drive to deliver such data can be segregated into three basic components: the seek time, or the time required to position the read/write head; the latency, or the time for the desired location on the disk to rotate under the read/write head; and the actual time to read the data and transfer it to memory.

Of the components contributing to the overall delay in reading the directory information elements, the seek time is the greatest. Current average seek times for single disk drives are between 8 and 12 milliseconds. However, track to track seek times tend to be below 2 milliseconds. This indicates that performance gains can be made by minimizing the distance the head must move from one read to the next. Thus, ideally, if DIRBLKs can be checked separately from the F-Nodes, with all of the F-Nodes being read in order based upon their location on the disk, head motion can be greatly reduced. This results in reduced seek time and a reduction in the overall time required for a single drive to deliver directory data.

A problem with checking the DIRBLKs separately from the F-Nodes arises from dependencies between the directory entries and their corresponding F-Nodes. Ideally, it would be preferable to check all of the directory entries at once, since the DIRBLKs containing the directory entries should be close together near the seek center of the drive. However, the correctness of the directory entries cannot be completely determined without the corresponding F-Nodes; similarly, the correctness of the F-Nodes cannot be completely determined without their corresponding directory entries. Memory constraints for present day machines prevent saving all of the DIRBLK and F-Node information for a single pass at validating the information. Only physical memory may be utilized since virtual memory swapped to space on a disk may not be utilized until the directory structure on the disk has been validated.

This dependency problem is circumvented by the present invention. Referring again to step 202, the process passes to step 204, which illustrates processing the directory entries first, to the extent possible. Each directory entry is validated in turn, and everything in each directory entry which can be validated without the corresponding F-Node is validated. The process then passes to step 206, which depicts saving both the information from each directory entry which has not been validated and the information from each directory entry which is required to validate the corresponding F-Node.

The process then passes within the initial cycle of the validation process to step 208, which illustrates a determination of whether an error has been detected which requires modification of the directory entry. If so, the process proceeds to step 210, which depicts queuing the error together with the needed corrective action until all of the F-Nodes have been processed. The process then passes to step 212, described below.

Referring back to step 208, if no errors requiring correction were detected, the process proceeds instead directly to step 212, which illustrates a determination of whether all directory entries have been processed to the extent possible. Directory entries contain a certain amount of information which may be validated independent of the contents of a corresponding F-Node. For example, the directory entry contains names, which may be checked for character validity and proper (alphabetical and/or case-sensitive) ordering, time stamps, which may be checked for whether they lie within a valid range, and attribute flags, which may be checked for illegal combinations. Directory entries also include offsets, signatures, and parent-child pointers which may be at least partially validated without reference to a corresponding F-Node. If additional directory entries remain to be processed, the process returns to step 204 for processing of another directory entry. Once all directory entries have been processed to the extent possible, with information which was not validated or which is required to validate a corresponding F-Node saved in physical memory and detected errors queued with respective corrective actions, the process passes to step 214, which depicts processing the F-Nodes corresponding to the directory entries. The F-Nodes point to the actual disk allocation for the corresponding directory entries, as well as duplication of the name, length, and some of the attribute flags. The allocation information identifies the portions of the disk in which information is stored for a given directory entry. F-Nodes also contain back-pointers which may be utilized to cross-check directory entry information to determine if the directory entry includes pointers to any space not allocated to that directory entry.

Once all of the F-Nodes have been processed, the process passes to step 216, which illustrates completing the processing of the directory entries, and then to step 218, which depicts processing the queued errors. Processing of the queued errors entails reading the DIRBLK which contains the faulty directory entry, taking corrective action, and then writing the DIRBLK. This requires that some DIRBLKs be read and/or written more than once, but the number of queued errors is not likely to be large enough to offset the gains achieved from the ordered reading of F-Nodes and the reduction of head motion achieved during processing of the directory entries. The process then passes to step 220, which depicts the process becoming idle until validation is again required.

Figure 3:
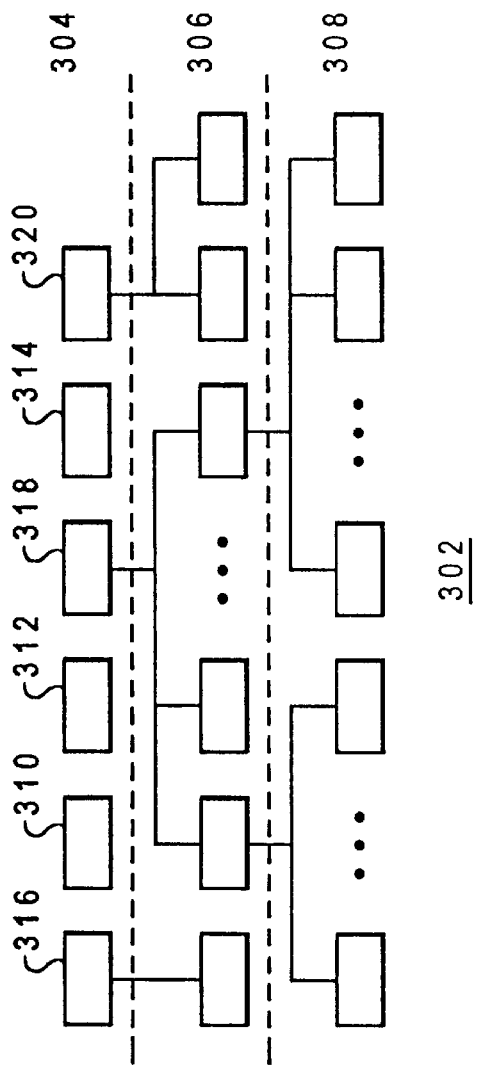
FIG. 3 depicts a block diagram of a directory structure within a storage device which may be validated in accordance with a preferred embodiment of the present invention.

With reference now to FIG. 3, a block diagram of a directory structure within a storage device which may be validated in accordance with a preferred embodiment of the present invention is depicted. Directory structure 302 is an HPFS directory including a plurality of levels 304–308, such as root level 304, intervening level 306, and lowest level 308. Each level 304–308 may include files 310–314 and directories 316–320. Although three levels are depicted in the exemplary embodiment, a directory structure validated in accordance with the present invention may include any number of directory levels.

Figure 4:
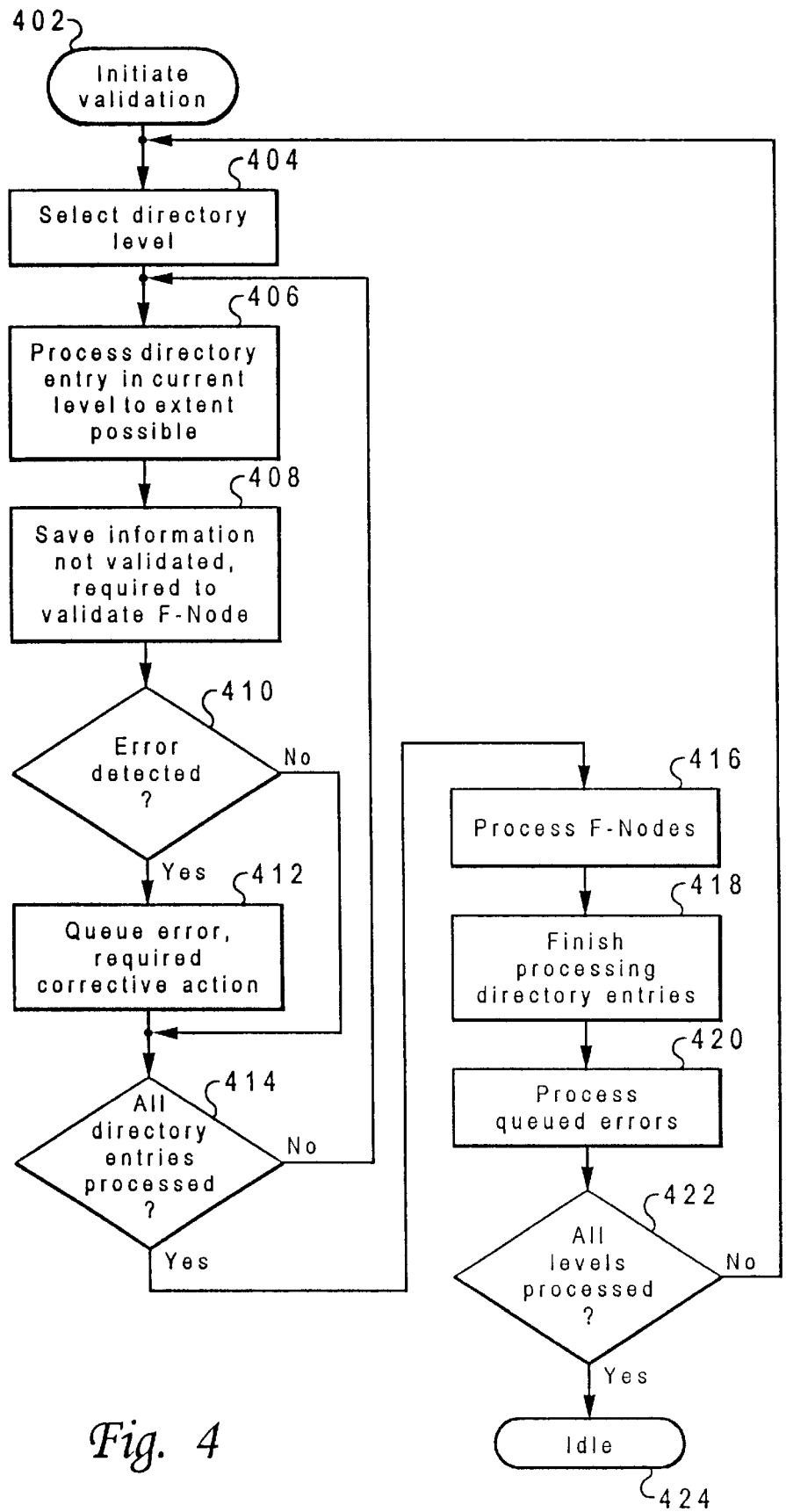
FIG. 4 is a high level flowchart for a modified process of validating a node-based file system in accordance with a preferred embodiment of the present invention.

Referring to FIG. 4, a high level flowchart for a modified process of validating a node-based file system in accordance with a preferred embodiment of the present invention is illustrated. The process described above in connection with FIG. 2 has performance advantages, but does have one major drawback: memory consumption. Most HPFS disk drives contain thousands of files, while large RAID systems may very well contain millions of files. It is not feasible to maintain the data required to complete validation of directory entries, as well as the data required to validate F-Nodes, in memory at the same time. A modified approach is required which permits ordered reads of large numbers of F-Nodes but which limits memory consumption.

The modified process of the present invention employs a breadth-first validation of the directory structure, processing the directory tree one level at a time from the root to the lowest levels. The process begins at step 402, which depicts initiation of the validation process, then passes to step 404, which illustrates selection of a directory level for processing. The process next passes to step 406, which depicts processing the directory entries within the current level to extent possible, then to step 408, which illustrates saving the information from the directory entries which could not be validated or which is required to validate the F-Nodes.

The process passes next to step 410, which depicts a determination of whether an error was detected. If so, the process proceeds to step 412, which illustrates queuing the detected error and the required corrective action, and, from step 412, the process passes to step 414. If no errors were detected, however, the process proceeds instead directly to step 414, which depicts a determination of whether all entries in the currently selected directory level have been processed. If not, the process returns to 406 for processing of another directory entry within the currently selected directory level.

Once all directory entries within the currently selected directory level have been processed, the process passes to step 416, which illustrates processing the F-Nodes for the currently selected directory level, and then to step 418, which depicts completing processing of the directory entries. The process next passes to step 420, which illustrates processing the queued errors detected within directory entries within the currently selected directory level. An alternative is to process all errors after directory entries for all directory levels have been checked, rather than processing errors detected within each level before proceeding to the next directory level. The process then passes to step 422, which depicts a determination of whether all levels of the directory structure being validated have been processed. If not, the process returns to step 404, for selection of another directory level. If all levels have been processed, however, the process passes instead to step 424, which illustrates the process becoming idle until validation is once again initiated.

The modified process of the present invention processes all directory entries for a given directory level, followed by processing the corresponding F-Nodes and any detected errors for the same directory level. This reduces the amount of data which must be stored for validating F-Nodes and directory entries, since only the information for the directory entries on one level of the directory structure need be saved. Once that level of the directory structure has been completely processed, the memory may be freed for reuse during processing of the next directory level.

This modified approach performs well since directory trees tend to be much wider than they are deep. Wider directory trees (larger directory levels) results in reading many DIRBLKs at the same time to process the directory entries which they contain, and reading the corresponding F-Nodes together. The reduced head motion and other performance benefits described above may thus still be achieved, while the memory required to store directory entry information and to queue errors and corrective actions is reduced.

Figure 5:
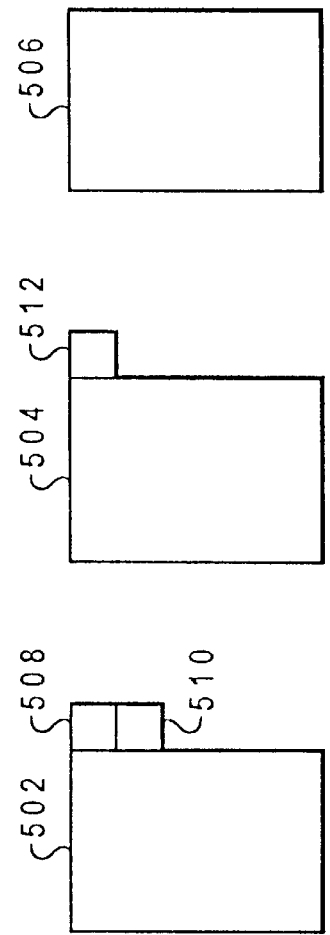
FIG. 5 depicts data structures employed in a process of validating a node-based file system which is optimized for RAID devices in accordance with a preferred embodiment of the present invention.

With reference now to FIG. 5, data structures employed in a process of validating a node-based file system which is optimized for RAID devices in accordance with a preferred embodiment of the present invention are illustrated. While reducing head motion yields performance benefits on all systems, RAID systems offer additional opportunities for performance enhancements. The key to taking advantage of RAID system characteristics is to be able to issue multiple I/O requests simultaneously.

If multiple read requests to a RAID system are generated and the data satisfying the requests are on different drives in the array, the RAID controller may issue all of the requests to their respective drives simultaneously. This allows the seek times for these requests to be overlapped, thereby reducing the overall time required to complete the multiple read requests. One of several methods for generating multiple read requests is to utilize multiple threads or processes, with each thread performing synchronous I/O operations. This requires that the validation process be divided into multiple segments which may be processed simultaneously.

The validation process optimized for RAID systems employs a Directory Group Queue 502. Since the goal is to issue multiple I/O requests simultaneously, segmentation of the directory entry checking portion of the validation process must be structured accordingly. Directory entries lie within DIRBLKs, with the DIRBLK comprising the basic unit of I/O when directory entries are being checked. Therefore, having multiple threads process directory entries in a DIRBLK would not yield the multiple simultaneous I/O requests desired. Issue of multiple requests to read DIRBLKs simultaneously is required, thus requiring an approach based on DIRBLKs rather than directory entries. In RAID 0 and RAID 5 systems, consecutive DIRBLKs may be striped across the drives in the system.

Since directories are composed of one or more DIRBLKs, an approach based on the processing of directories should work well. With a breadth-first strategy for processing the directory structure, a simple way to segment the checking of directory entries would be to assign each directory to a thread for checking. Each thread would be responsible for reading and processing each of the DIRBLKs which comprise a directory. Processing of a DIRBLK entails checking all of the directory entries in that DIRBLK. By having each directory on a given level of the directory tree checked simultaneously by different threads, the portion of the validation process which checks directory entries should generate multiple simultaneous I/O requests.

The validation process of the present invention optimized for RAID systems also employs an F-Node Group Queue 504. F-Nodes are independent of one another, having dependencies only on their corresponding directory entries. F-Nodes thus present a simple portion of the validation process for segmentation into multiple processes to utilize multiple threads. The information required for checking each F-Node is saved when the corresponding directory entry is checked. Thus, to check an F-Node, each thread only needs the logical sector number of the F-Node and the data saved during checking of the corresponding directory entry.

F-Node Group Queue 504 is a special queue, a Min Heap. F-Nodes are automatically ordered within the queue based on their logical sector number so that they will be accessed in ascending order, thereby reducing drive head motion and I/O time. In alternative embodiment, the F-Nodes could be ordered for access in descending order.

The validation process of the present invention optimized for RAID systems also employs a Directory Action Queue 506, a Directory Group Event Semaphore 508, a Directory Tree Walk Complete Semaphore 510, and an F-Node Group Event Semaphore 512, employed as described below. Other data structures may also be employed.

Figure 6A:
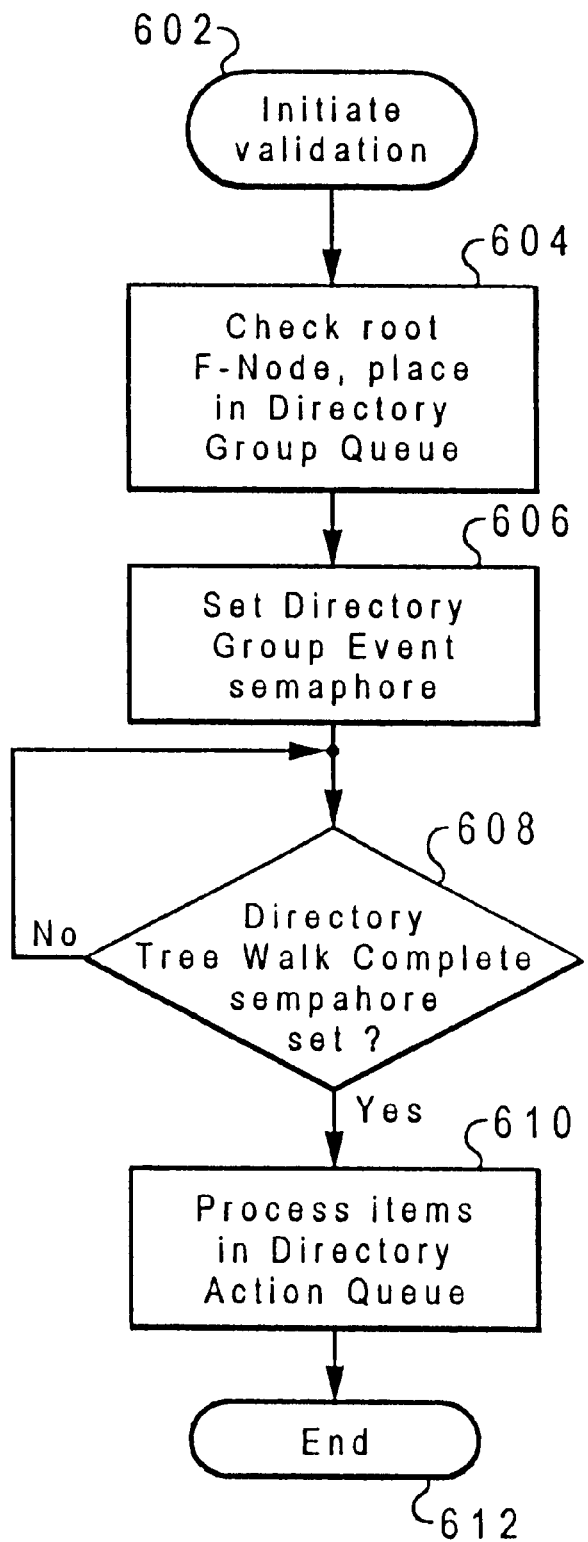
FIGS. 6A–6C are high level flowcharts for a process of validating a node-based file system which is optimized for RAID devices in accordance with a preferred embodiment of the present invention.
Figure 6B:
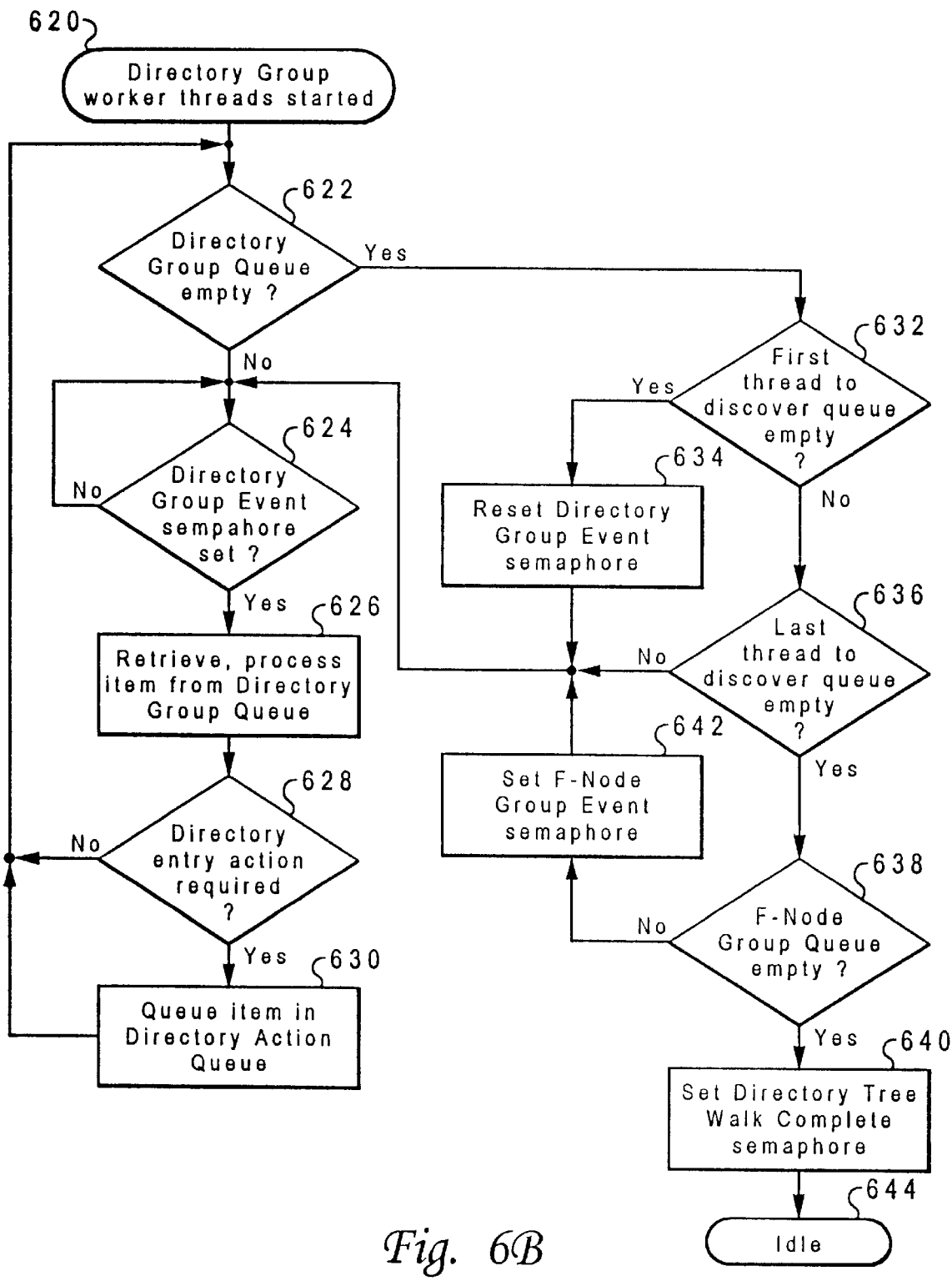
Figure 6C:
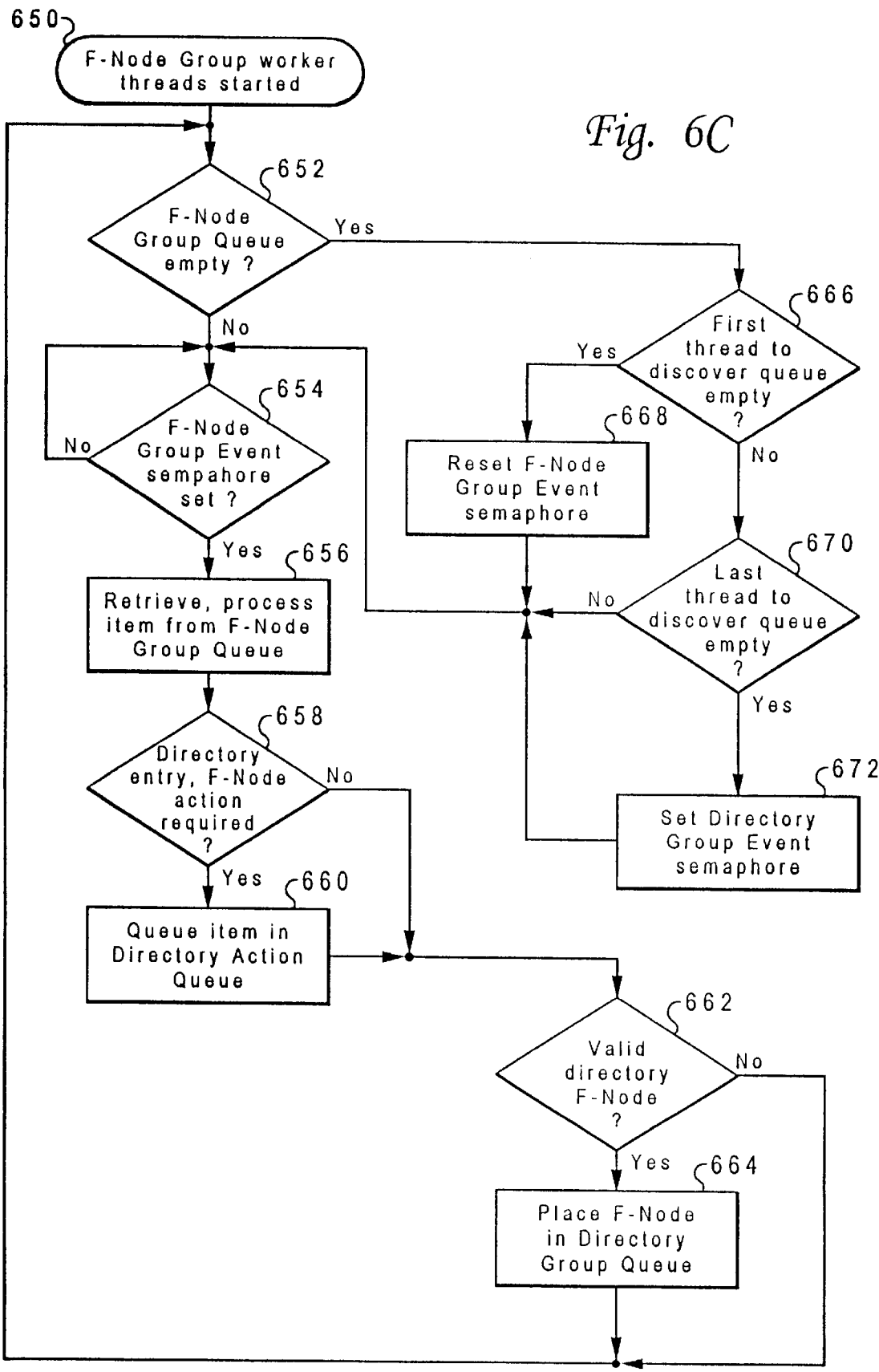

Referring to FIGS. 6A–6C, high level flowcharts for a process of validating a node-based file system which is optimized for RAID devices in accordance with a preferred embodiment of the present invention is depicted. To circumvent the problems associated with traditional methods for validating a RAID device employing an HPFS directory structure, the processing of directory entries and F-Nodes are divided into two separate functional groups: the Directory Group and the F-Node Group. Each functional group has multiple threads assigned to them, and the actions of the two groups are coordinated—between the threads of the two groups and with the main process thread—through the use of semaphores and counters. Each functional group has a single input queue from which the worker threads of that group draw items to process. Three portions of the overall process are depicted: the operation of the main thread (FIG. 6A), the operation of the Directory Group worker threads (FIG. 6B), and the operation of the F-Node Group worker threads (FIG. 6C).

FIG. 6A depicts the operation of the main thread of the RAID-optimized validation process. The process begins at step 602, which depicts initiation of the validation process. From step 602, the process of the main thread passes to step 604, which illustrates beginning the Directory Tree Walk by checking the Root F-Node and then placing it, together with any necessary information, into the Directory Group Queue. The process then passes to step 606, which depicts setting the Directory Group Event semaphore, releasing the Directory Group worker threads to begin processing directories. The process of the main thread then passes to step 608, which illustrates the main thread blocking on the Directory Tree Walk Complete semaphore, which will be set when the Directory Tree Walk is complete to allow the main thread to resume operation and perform any clean up required.

The Directory Tree Walk Complete semaphore is set after all of the F-Nodes and directory entries have been checked by the processes depicted in FIGS. 6B and 6C and described below. Once the Directory Tree Walk Complete semaphore is set, the process of the main thread proceeds to step 610, which depicts processing all items placed in the Directory Action Queue. Processing of these items may entail additional disk I/O, but only for directories where errors have been found. Regardless, the number of errors located would have to be extremely large to offset the performance gains achieved by using the present invention. Once the items in the Directory action Queue have been processed, the process passes to step 612, which illustrates the process ending and killing any ongoing related processes such as those described below in connection with FIGS. 6B and 6C.

FIG. 6B depicts the operation of worker threads within the Directory Group. The number of worker threads operating in parallel is a matter of design choice, but each thread within the Directory Group operates as shown. The process begins at step 620, which depicts the start of the Directory Group worker threads. The Directory Group worker threads are started, as described above, by setting the Directory Group Event semaphore. The process then passes to step 622, which illustrates a determination of whether the Directory Group Queue is empty, and to step 624, which depicts a determination of whether the Directory Group Event semaphore is set. When the Directory Group Queue is empty, then the Directory Group worker threads block on the Directory Group Event semaphore. However, if the Directory Group Queue is NOT empty and the Directory Group Event Semaphore is set, then the process proceeds to step 626, which depicts each thread retrieving an item (a directory) from the Directory Group Queue and processing it.

Processing of an item from the Directory Group Queue entails checking each DIRBLK in the directory, and each directory entry within the DIRBLK(s). For each valid directory entry, the F-Node specified in the directory entry is placed in the F-Node Group queue, along with any other necessary information. The process then passes to step 628, which illustrates a determination of whether a directory entry action is required. If directory entries need to be deleted, or if the directory needs to be rebalanced, the process proceeds to step 630, which depicts placing an item in the Directory Action Queue. As described above, the Directory Action Queue is processed after the Directory Tree Walk has been completed.

From either step 628 or step 630, the process returns to step 622, described above. When the Directory Group Queue is empty, the process proceeds to step 632, which illustrates a determination of whether the thread discovering the Directory Group Queue empty is the first thread to find that queue empty. If so, the process proceeds to step 634, which depicts resetting the Directory Group Event semaphore. The first thread to discover the Directory Group Queue empty then blocks on the Directory Group Event semaphore. Subsequent threads which discover the Directory Group Queue empty will pass through step 632 to step 636, which illustrates a determination of whether the thread is the last to find the Directory Group Queue empty. If not (that is, for threads between the first and last threads to discover the Directory Group Queue empty), the process proceeds to step 624, where the blocking of Directory Group worker threads on the Directory Group Event semaphore is depicted.

For the last thread to discover the Directory Group Queue empty, the process proceeds to step 638, which illustrates checking the size of the F-Node Group Queue (i.e. a determination of whether the F-Node Group Queue is empty). If the F-Node Group Queue is not empty, the process proceeds to step 642, which illustrates setting the F-Node Group Event semaphore, starting the F-Node Group worker threads. The process then returns to step 624, described above.

If the F-Node Group Queue is empty, however, the process proceeds instead to step 640, which depicts setting the Directory Tree Walk Complete semaphore. From step 640, the process passes to step 644, which depicts the Directory Group worker threads becoming idle until started again by setting of the Directory Group Event semaphore. The last thread to discover the Directory Group Queue empty also blocks on the Directory Group Event semaphore.

FIG. 6C depicts the operation of worker threads within the F-Node Group. As with the Directory Group, the number of worker threads operating in parallel is a matter of design choice, but each thread within the F-Node Group operates as shown. The process begins at step 650, which depicts the start of the F-Node Group worker threads by setting the F-Node Group Event semaphore. The process then passes to step 652, which illustrates a determination of whether the F-Node Group Queue is empty, and to step 654, which depicts a determination of whether the F-Node Group Event semaphore is set. When the F-Node Group Queue is empty, then all of the F-Node Group worker threads will block on the F-Node Group Event semaphore. If the F-Node Group Queue is NOT empty AND the F-Node Group Event semaphore is set, then each worker thread in the F-Node Group retrieves an item from the F-Node Group Queue and processes it, as depicted in step 656.

Processing of an item from the F-Node Group Queue consists of checking all of the fields in the F-Node, correcting any fields which require correction, and deciding whether to keep or delete the F-Node. Part of the process of checking an F-Node is determining whether an F-Node or directory entry action is required, as illustrated in step 658. If the F-Node contains errors which cannot be corrected, or if the directory entry corresponding to the F-Node needs to be modified, the thread processing this F-Node enters an item in the Directory Action Queue, as depicted in step 660. Again, processing of the Directory Action Queue is deferred until after the Directory Tree Walk is completed.

From either of steps 658 or 660, the process passes to step 662, which depicts a determination of whether the F-Node being processed by the worker thread is a valid, directory F-Node. If the F-Node being processed is a directory F-Node, then, after checking is complete and the F-Node is found to be valid, the F-Node is placed in the Directory Group Queue as illustrated in step 664, together with any other necessary information.

After processing an item from the F-Node Group Queue, the process of an F-Node Group worker thread returns to step 652, described above. As with the operation of the Directory Group worker threads, the first F-Node Group worker thread to discover that the F-Node Group Queue is empty resets the F-Node Group Event semaphore, and then blocks on the F-Node Group Event semaphore (steps 666 and 668). All of the other threads also block on the F-Node Group Event semaphore as they discover that the F-Node Group Queue is empty (steps 666 and 670). The last thread to discover that the F-Node Group Queue is empty will, prior to blocking on the F-Node Group Event semaphore, set the Directory Group Event semaphore, starting the Directory Group worker threads (step 672). The process then passes back to step 654, described above. The process of FIG. 6C thus forms an infinite loop, although the process is eventually destroyed by other processes, such as the process depicted in FIG. 6A.

The processes depicted in FIGS. 6A–6C combine to validate the storage media in accordance with the present invention. The main thread places the root F-Node or the FNodes for the current directory level in the Directory Group Queue and sets the Directory Group Event semaphore before blocking on the Directory Tree Walk Complete semaphore, as depicted in FIG. 6A. The Directory Group worker threads, started by the setting of the Directory Group Event semaphore, find the F-Node(s) for the current level in the Directory Group Queue. The Directory Group worker threads then process DIRBLKs corresponding to these F-Nodes to the extent possible and place information from the directory entries in the F-Node Group Queue and, if necessary, place items in the Directory Action Queue. Once all directory entries for a current directory level have been processed to the extent possible, the Directory Group worker threads—after determining that the F-Node Group Queue is not empty—set the F-Node Group Event semaphore before blocking on the Directory Group Event semaphore as depicted in FIG. 6B.

The F-Node Group worker threads, started by the setting of the F-Node Group Event semaphore, process the information in the F-Node Group Queue. If necessary, items are queued in the Directory Action Queue. For directory F-Nodes (for the next directory level) which are found to be valid, the F-Node Group worker threads write the F-Node information to the Directory Group Queue, and, when the F-Node Group Queue is empty, set the Directory Group Event semaphore and block on the F-Node Group Event semaphore as depicted in FIG. 6C.

The Directory Group worker threads, started again by the setting of the Directory Group Event semaphore, complete processing of the directory entries for the last directory level and begin processing directory entries for the next directory levels. The process thus switches between the Directory Group worker threads and the F-Node Group worker threads until the last directory level is reached. At this level, the Directory Group worker threads will find the F-Node Group Queue empty and will set the Directory Tree Walk Complete semaphore, restarting the main thread. The main thread then processes items in the Directory Action Queue.

The process depicted in and described in connection with FIGS. 6A–6C may be implemented in a validation program which is up to twice as fast as known implementations for non-RAID systems, and up to eleven times faster on large RAID systems. Thus, the time required to bring a system back on line, which may be critical, is minimized. The overall recovery time may be reduced by as much as a factor of 10 over existing methods.

The present invention allows a node-based file system to be validated in a manner which minimizes the required head movement and thus minimizes the time required to complete validation. By checking the directory entries to the extent possible, saving any required information and queuing any detected errors, then checking the F-Nodes, the performance benefits derived by minimizing the head motion required to read the F-Nodes for checking are obtained. A breadth-first, level-by-level approach to validating the directory structure may be employed to reduce the amount of memory required. The process portions of checking directory entries and checking F-Nodes may be further segmented into multiple threads to achieve additional benefits in RAID systems where multiple I/O requests may be issued simultaneously.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of validating a node-based file system, comprising:

reading a plurality of first components of directory information from a storage media;

checking the plurality of first components of directory information to an extent that validation of the first components of directory information is not dependent upon a plurality of second components of directory information;

saving information from the plurality of first components of directory information which was not validated or which is required to validate the plurality of second components of directory information;

reading the plurality of second components of directory information; and checking the plurality of second components of directory information.

2. The method of claim 1, wherein the first components are located within a first region of the storage media and wherein the step of reading a plurality of first components of directory information further comprises:

reading a plurality of directory entries.

3. The method of claim 1, wherein the step of reading a plurality of second components of directory information further comprises:

reading a plurality of F-Nodes.

4. The method of claim 1, wherein the step of reading a plurality of first components of directory information further comprises:

reading a plurality of first components of directory information for directories within a first level of a hierarchical directory structure.

5. The method of claim 4, wherein the step of checking the plurality of second components of directory information further comprises:

checking a plurality of second components of directory information for directories within the first level of the hierarchical directory structure.

6. The method of claim 5, further comprising:

after checking the plurality of second components of directory information for directories within the first level of the hierarchical directory structure, reading a plurality of first components of directory information for directories within a second level of the hierarchical directory structure.

7. The method of claim 1, further comprising:

after checking the plurality of second components of directory information, completing checking of the plurality of first components of directory information.

8. The method of claim 1, further comprising:

queuing detected errors for processing after completing checking of both the first and second components of directory information.

9. The method of claim 8, further comprising:

reading components of directory information required for processing the detected errors.

10. The method of claim 1, wherein:

the step of reading a plurality of first components of directory information further comprises reading a portion of first components of directory information located within a first region; and the step of reading the plurality of second components of directory information further comprises reading a portion of second components of directory information located within a second region of the storage media and corresponding to the portion of first components.

11. A method of validating a node-based file system stored across a plurality of storage media, each storage media within the plurality of storage media having first and second regions, comprising:

requesting a plurality of first components of directory information, wherein each component within the plurality of first components is located within a first region of storage media within the plurality of storage media;

checking the plurality of first components of directory information to an extent that validation of the first components of directory information is not dependent upon a plurality of second components of directory information;

saving information from the plurality of first components of directory information which was not validated or which is required to validate the plurality of second components of directory information, wherein each component within the plurality of second components is located within a second region of storage media within the plurality of storage media;

reading the plurality of second components of directory information; and checking the plurality of second components of directory information.

12. The method of claim 11, wherein the step of requesting a plurality of first components of directory information further comprises:

utilizing multiple threads performing synchronous I/O operations to read the plurality of first components.

13. A method of validating a node-based file system, comprising:

activating a first group of threads to process directory information within a directory area of a storage media, each thread within the first group of threads reading directory-area directory information for a directory within a current level, processing the directory-area directory information to an extent that validation of the directory-area directory information is not dependent on directory information within a file area, and blocking on a first semaphore;

setting the first semaphore when all directory-area directory information for directories in the current level has been processed;

activating a second group of threads to process the directory information within a file area of the storage media, each thread within the second group of threads reading file-area directory information for a directory within the current level, processing the file-area directory information, and blocking on a second semaphore; and setting the second semaphore when all file-area directory information for directories in the current level has been processed.

14. The method of claim 13, further comprising:

after the second group of threads process the file-area directory information for the current level, resetting the first semaphore.

15. The method of claim 13, wherein the step of activating a first group of threads further comprises:

activating the first group of threads to complete processing of directory-area directory information for a previous level, each thread within the second group of threads reading file-area directory information for a directory within the previous level and processing the file-area directory information for the previous level.

16. The method of claim 15, further comprising:

after the first group of threads completes processing of the directory-area directory information for the previous level and processes the directory-area directory information for the current level to a predetermined extent, resetting the second semaphore.

17. The method of claim 16, further comprising:

after the first group of threads completes processing of the directory-area directory information for a last level, setting a third semaphore and deactivating the first and second groups of threads.

18. An apparatus for validating a node-based file system, comprising:

first reading means for reading a plurality of first components of directory information, wherein the first components located within a first region of a storage media;

first validation means for checking the plurality of first components of directory information to an extent that validation of the first components of directory information is not dependent upon a plurality of second components of directory information;

memory means for saving information from the plurality of first components of directory information which was not validated or which is required to validate the plurality of second components of directory information;

second reading means for reading the plurality of second components of directory information; and second validation means for checking the plurality of second components of directory information.

19. The apparatus of claim 18, wherein the first reading means further comprises:

means for reading a plurality of directory entries.

20. The apparatus of claim 18, wherein the second reading means further comprises:

means for reading a plurality of F-Nodes.

21. The apparatus of claim 18, wherein the first reading means further comprises:

means for reading a plurality of first components of directory information for directories within a first level of a hierarchical directory structure.

22. The apparatus of claim 21, wherein the second validation means further comprises:

means for checking a plurality of second components of directory information for directories within the first level of the hierarchical directory structure.

23. The apparatus of claim 22, further comprising:

third reading means, actuated after checking the plurality of second components of directory information for directories within the first level of the hierarchical directory structure, for reading a plurality of first components of directory information for directories within a second level of the hierarchical directory structure.

24. The apparatus of claim 18, further comprising:

third validation means, actuated after checking the plurality of second components of directory information, for completing checking of the plurality of first components of directory information.

25. The apparatus of claim 18, further comprising:

queue means for queuing detected errors for processing after completing checking of both the first and second components of directory information.

26. The apparatus of claim 25, further comprising:

third reading means for reading components of directory information required for processing the detected errors.

27. A computer program product within a computer usable medium, comprising:

instructions on the computer usable medium for reading a plurality of first components of directory information, wherein the first components are located within a first region of a storage media;

instructions on the computer usable medium for checking the plurality of first components of directory information to an extent that validation of the first components of directory information is not dependent upon a plurality of second components of directory information;

instructions on the computer usable medium for saving information from the plurality of first components of directory information which was not validated or which is required to validate the plurality of second components of directory information;

instructions on the computer usable medium for reading the plurality of second components of directory information, wherein the plurality of second components of directory information are located within a second region of the storage media;

instructions on the computer usable medium for checking the plurality of second components of directory information; and instructions on the computer usable medium, executed after the instructions for checking the plurality of second components of directory information, for completing checking of the plurality of first components of directory information.

28. The computer program product of claim 27, wherein the instructions for reading a plurality of first components of directory information further comprise:

instructions for reading a plurality of first components of directory information for directories within a first level of a hierarchical directory structure.

29. A computer program product in a computer usable medium, comprising:

instructions on the computer usable medium for activating a first group of threads to process directory information within a directory area of a storage media, each thread within the first group of threads reading directory-area directory information for a directory within a current level, processing the directory-area directory information to an extent that validation of the directory-area directory information is not dependent upon directory information within a file area, and blocking on a first semaphore;

instructions on the computer usable medium for setting the first semaphore when all directory-area directory information for directories in the current level has been processed;

instructions on the computer usable medium for activating a second group of threads to process the directory information within the file area of the storage media, each thread within the second group of threads reading file-area directory information for a directory within the current level, processing the file-area directory information, and blocking on a second semaphore; and instructions on the computer usable medium for setting the second semaphore when all file-area directory information for directories in the current level has been processed.

30. The computer program product of claim 29, further comprising:

instructions on the computer usable medium for activating the first group of threads to complete processing of directory-area directory information for a previous level, each thread within the second group of threads reading file-area directory information for a directory within the previous level and processing the file-area directory information for the previous level;

instructions on the computer usable medium, responsive to completion of processing of the directory-area directory information for the previous level and processing of the directory-area directory information for the current level to a predetermined extent, for resetting the second semaphore; and instructions on the computer usable medium, responsive to completion of processing of the directory-area directory information for a last level, for setting a third semaphore and deactivating the first and second groups of threads.

* * * * *